United States Patent
Chou et al.

(10) Patent No.: US 8,116,329 B2
(45) Date of Patent: Feb. 14, 2012

(54) RELAY STATION, BASE STATION, POWER MANAGEMENT METHOD, AND COMPUTER READABLE MEDIUM THEREOF FOR USE IN A WIRELESS MESH NETWORK

(75) Inventors: Zi-Tsan Chou, Taipei (TW); Yu-Hsiang Lin, Kuei-Shan Hsiang (TW); Ching-Chi Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 692 days.

(21) Appl. No.: 12/235,854

(22) Filed: Sep. 23, 2008

(65) Prior Publication Data

US 2009/0279474 A1  Nov. 12, 2009

(30) Foreign Application Priority Data

May 8, 2008 (TW) .................................. 97116976 A

(51) Int. Cl.
*H04L 12/28* (2006.01)
(52) U.S. Cl. ........................................ 370/401; 370/315
(58) Field of Classification Search .................. 370/315, 370/401, 229–231
See application file for complete search history.

(56) References Cited

U.S. PATENT DOCUMENTS

| | | | |
|---|---|---|---|
| 7,391,746 B2 * | 6/2008 | Morimoto et al. | 370/311 |
| 2004/0165574 A1 * | 8/2004 | Kakumaru et al. | 370/349 |
| 2005/0138451 A1 * | 6/2005 | Simpson et al. | 713/320 |
| 2006/0028984 A1 * | 2/2006 | Wu et al. | 370/230 |
| 2006/0285527 A1 * | 12/2006 | Gao et al. | 370/338 |
| 2007/0019573 A1 * | 1/2007 | Nishimura | 370/279 |
| 2007/0050523 A1 * | 3/2007 | Emeott et al. | 709/248 |
| 2007/0135059 A1 * | 6/2007 | Yomo et al. | 455/69 |
| 2007/0238438 A1 * | 10/2007 | Alon et al. | 455/343.2 |
| 2008/0130603 A1 * | 6/2008 | Wentink et al. | 370/338 |
| 2008/0274692 A1 * | 11/2008 | Larsson | 455/24 |
| 2009/0279449 A1 * | 11/2009 | Kneckt et al. | 370/253 |
| 2010/0296495 A1 * | 11/2010 | Iino et al. | 370/338 |

* cited by examiner

*Primary Examiner* — Gary Mui
(74) *Attorney, Agent, or Firm* — Patterson Thuente Christensen Pedersen, P.A.

(57) ABSTRACT

A relay station, a base station, a power management method, and a computer readable medium thereof are provided. The relay station is located within the coverage area of the BS. The relay station comprises a receiving/transmission module and a determination module. The receiving/transmission module is configured to receive a BS beacon in a first period of time. The determination module is configured to allow the BS to transmit a data to the relay station according to the BS beacon, so that the receiving/transmission module transmits a power saving poll to the BS, receives a power saving poll ACK in the first period of time, and receives the data in a second period of time after the first period of time.

30 Claims, 10 Drawing Sheets

RELAY STATION, BASE STATION, POWER MANAGEMENT METHOD, AND COMPUTER READABLE MEDIUM THEREOF FOR USE IN A WIRELESS MESH NETWORK

This application claims the benefit of priority based on Taiwan Patent Application No. 097116976 filed on May 8, 2008, the disclosure of which are incorporated by reference herein in their entirety.

CROSS-REFERENCES TO RELATED APPLICATIONS

Not applicable.

BACKGROUND OF THE INVENTION

1. Field of the Invention

The present invention relates to a relay station, a base station, a power management method, and a computer readable medium thereof for use in a wireless mesh network. More specifically, the present invention relates to a relay station, a base station, a power management method, and a computer readable medium thereof for use in a wireless mesh network based on the IEEE 802.11 standard.

2. Descriptions of the Related Art

Over recent years, an emerging network architecture known as the wireless mesh network has become more popular. Accordingly, numerous companies, such as Motorola, have begun to develop the associated software and hardware facilities for the wireless mesh network. FIG. 1 illustrates a schematic view of a conventional wireless mesh network 1. The wireless mesh network 1 is primarily composed of an infrastructure wireless local area network (WLAN) 10 connected with an ad-hoc network 11 via a relay station (RS) 120, i.e., a mobile station (MS) with a relaying capability.

The infrastructure WLAN 10 comprises a base station (BS) 100, mobile stations (MSs) 101, 102 and a relay station 120. From the viewpoint of the infrastructure WLAN 10, the relay station 120 does not perform any relaying operations and thus is considered simply as an MS. Each of the MSs (i.e., the MSs 101, 102 and the RS 120) within the infrastructure WLAN 10 must be registered with the BS 100 to share internet services. More particularly, at the start of a beacon interval, the BS 100 broadcasts a beacon to each of the MSs (i.e., the MSs 101, 102 and the RS 120) within the infrastructure WLAN 10. There are two main functions of the beacon. One of the functions is for all MSs (i.e., the MSs 101, 102 and the RS 120) to synchronize with BS 100. The other function is for the BS to inform all MSs in power saving mode whether they have data buffered in the BS 100. Each of the MSs in power saving mode checks if the BS 100 attempts to transmit data to the MS according to the traffic indication map (TIM) in the beacon. The MSs that does not have data buffered in the BS 100 may remain in power saving mode. On the other hand, the MSs which need to receive data from the BS 100 needs to leave the power saving mode and transmit a power saving poll to the BS 100 to inform the BS 100 to transmit the data now. In this way, various internet services are enabled to run smoothly.

In addition, the ad-hoc network 11 comprises MSs 110, 111 and the RS 120. From the viewpoint of the ad-hoc network 11, the RS 120 does not perform any relaying operations and thus is simply considered as an MS. In the power-saving mode, each beacon interval is divided into an Announcement Traffic Indication Map window (ATIM window) and a data window. At the start of the beacon interval, each of the MSs (i.e., the MSs 110, 111 and the RS 120) within the ad-hoc network 11 wakes up to compete sending a beacon, and the winner gets the right to send a beacon, wherein the beacon is used to accomplish the synchronization with the other MSs. When attempting to transmit data to the RS 120, the MS 110 sends an Announcement Traffic Indication Map frame (ATIM frame) during the ATIM window to inform the RS 120 of this attempt. In response to the ATIM frame, the RS 120 returns an ATIM ACK to the MS 110. Within the data window, the MS 110 and the RS 120 keep awake all along, so that the MS 110 can transmit data to the RS 120. MSs (i.e., the MSs 110, 111 or the RS 120) that neither transmitted nor received an ATIM frame may return to the doze state at the end of ATIM window.

The wireless mesh network 1 combines the infrastructure WLAN 10 and the ad-hoc H network 11 as shown in FIG. 1. The advantage of the wireless mesh network 1 is that the MSs (e.g., the MS 110 or 111) still enjoy the Internet services by connecting with the BS 100 via the RS 120 even the MSs are not located within the coverage area of the BS 100.

However, when acting in power saving mode, the wireless mesh network 1 has the following disadvantages. FIG. 2 illustrates a schematic view of a signal transmission in the conventional wireless mesh network 1. In FIG. 2, the axes corresponding to the BS, the RS and the MS denote time axes corresponding to the BS 100, the RS 120, and the MS 110 of FIG. 1 respectively. The beacon interval 2 includes an ATIM window 20 and a data window 21. Since the BS 100 and the RS 120 belong to the infrastructure WLAN, the BS 100 is unaware of the ATIM window 20 defined in the beacon interval as well as the presence of the MS 110.

In the example, the BS 100 attempts to transmit data 204 to the RS 120 and the RS 120 in turn to transmit the data 204 to the MS 110. At the outset, the BS 100 broadcasts a beacon 200 to the RS 120. Since the BS 100 and the MS 110 are not located within the coverage areas of each other, neither of them can receive the beacon transmitted by the other. By checking the beacon 200, the RS 120 learns that the BS 100 attempts to transmit the data 204, and then sends a power saving poll 202 to the BS 100. In response to the power saving poll 202, the BS 100 proceeds to transmit the data 204. After receiving the data 204, the RS 120 sends a data acknowledge signal 205 to the BS 100. At this point, a problem occurs. Because the size of data 204 may be large, the RS 120 probably has no chance to send an ATIM frame to the MS 110 prior to the end of the ATIM window 20, causing the MS 110 to return to doze state when the ATIM window 20 comes to an end. Consequently, the RS 120 has to wait until the next beacon interval to retry transmission of the data 204 to the MS 110. In other words, the data 204 experiences a delay longer than one beacon interval. Moreover, from the viewpoint of the RS 120 and the MS 110 (i.e., the ad-hoc network 11), the ATIM window 20 is used to transmit control signals (including an ATIM frame) for the individual MSs rather than to transmit data. The data transmission should occur within the data window.

FIG. 3 illustrates another schematic view of a signal transmission in the wireless mesh network 1. Because FIG. 3 is similar to FIG. 2, only the different portions will be described herein. In FIG. 3, both the BS 100 and the MS 110 attempt to transmit data to the RS 120. The MS 110, which is attempting to transmit data to the RS 120, has to send an ATIM frame 206 to the RS 120. However, in this case, the RS 120 also receives data 204 simultaneously while receiving the ATIM frame 206, thus leading to a collision 207. This makes it impossible for the RS 120 to tell whether the receiving frame is the ATIM frame 206 from the MS 110 or the data 204 from the BS 100. As a consequence, both the data 204 and the ATIM frame 206 of the MS 110 have to be retransmitted.

Both cases illustrated in FIG. 2 and FIG. 3 may cause a decrease in the throughput of the wireless mesh network 1 within a single beacon interval. Therefore, it is important to increase the throughput within a single beacon interval by delaying data transmission from the ATIM window to the data window.

SUMMARY OF THE INVENTION

One objective of the present invention is to provide an RS for use in a wireless mesh network. The wireless mesh network comprises a BS. The RS is located within a coverage area of the BS. The RS comprises a receiving/transmission module and a determination module. The receiving/transmission module is configured to receive a BS beacon of the BS in a first period of time. The determination module is configured to determine that the BS attempts to transmit a first data to the RS as a determination result according to the BS beacon. The receiving/transmission module is further configured to transmit a power saving poll to the BS in the first period of time in response to the determination result, receive a power saving poll acknowledgement (ACK) of the BS in response to the transmission of the power saving poll, and receive the first data of the BS in a second period of time after the first period of time.

Another objective of the present invention is to provide a power management method for use in an RS of a wireless mesh network. The wireless mesh network comprises a BS. The RS is located within a coverage area of the BS, The power management method comprises the following steps: receiving a BS beacon of the BS in a first period of time; determining that the BS attempts to transmit a first data to the RS as a determination result according the BS beacon; transmitting a power saving poll to the BS in the first period of time in response to the determination result; receiving a power saving poll ACK of the BS in response to the transmission of the power saving poll; and receiving the first data of the BS in a second period of time after the first period of time.

Yet another objective of the present invention is to provide a computer readable medium containing instructions for enabling an RS of a wireless mesh network to perform transmission. The wireless mesh network comprises a BS. The RS is located within a coverage area of the BS. The instructions comprises code that enables the RS to receive a BS beacon of the BS in a first period of time; code that enables the RS to determine that the BS attempts to transmit a first data to the RS as a determination result according the BS beacon; code that enables the RS to transmit a power saving poll to the BS in the first period of time in response to the determination result; code that enables the RS to receive a power saving poll ACK of the BS in response to the transmission of the power saving poll; and code that enables the RS to receive the first data of the BS in a second period of time after the first period of time.

Yet a further objective of the present invention is to provide a BS. An RS is located within a coverage area of the BS. The BS comprises a transmission module and a receiving module. The transmission module is configured to broadcast a BS beacon in a first period of time. The receiving module is configured to receive a power saving poll of the RS in the first period of time. The transmission module is further configured to transmit a power saving poll ACK to the RS in response to the power saving poll and transmit data to the RS in a second period of time after the first period of time.

Still another objective of the present invention is to provide a power management method for use in a BS. The power management method comprises the following steps: broadcasting a BS beacon in a first period of time; receiving a power saving poll of an RS located within a coverage area of the BS in the first period of time; transmitting a power saving poll ACK to the RS in response to the power saving poll; and transmitting data to the RS in a second period of time after the first period of time.

Still a further objective of the present invention is to provide a computer readable medium containing instructions for enabling a BS to perform transmission. The instructions comprises code that enables the BS to broadcast a BS beacon in a first period of time; code that enables the BS to receive a power saving poll of an RS located within a coverage area of the BS in the first period of time; code that enables the BS to transmit a power saving poll ACK to the RS in response to the response signal; and code that enables the BS to transmit data to the RS in a second period of time after the first period of time.

According to the present invention, by transmitting a power saving poll ACK from a BS to an RS when the BS receives a power saving poll, data transmission from the BS to the RS will be postponed from a first period of time (i.e., ATIM window) to a second period of time (i.e., a part of the data window). In this way, instead of occurring within the first period of time, data transmission can be effectively postponed until the second period of time to increase the efficiency within a single beacon period.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
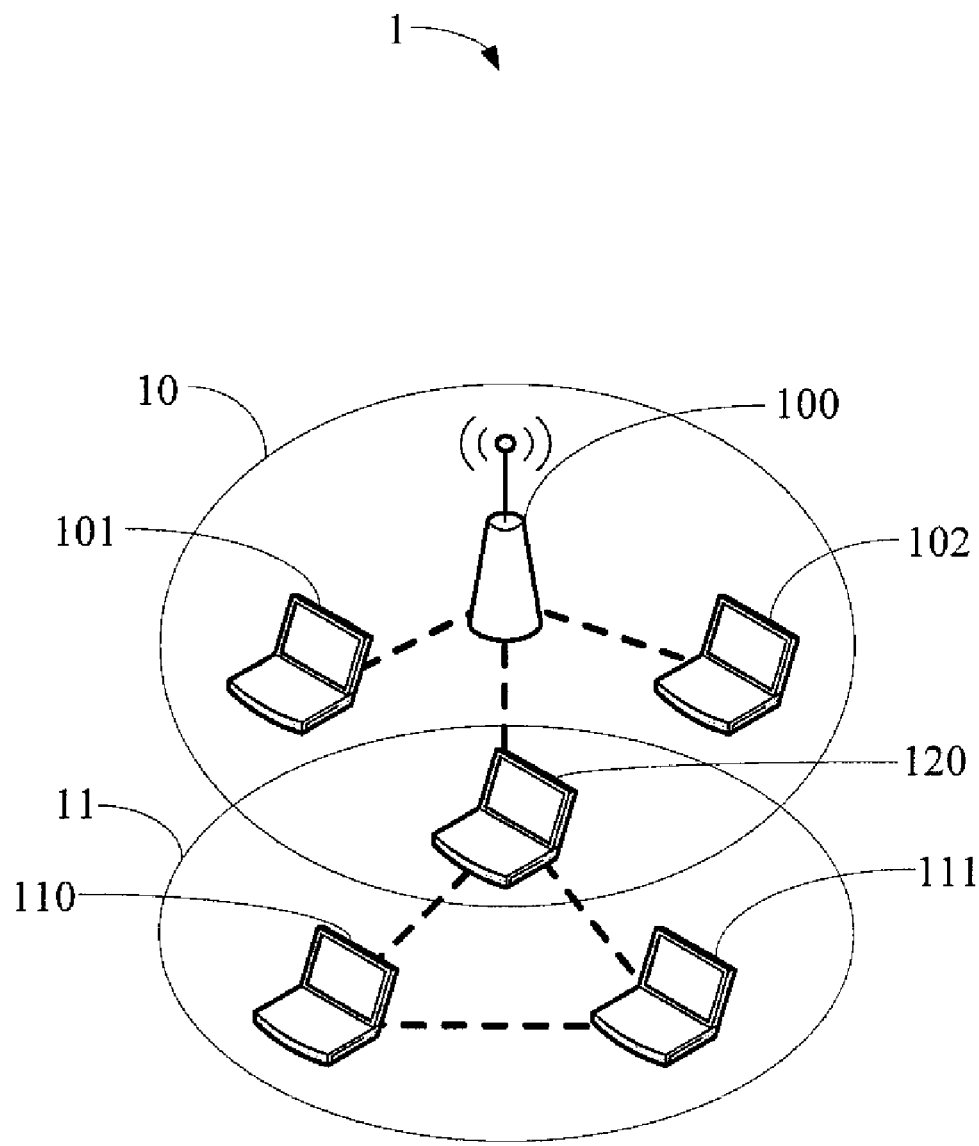
FIG. 1 is a schematic view of a conventional wireless mesh network.
Figure 2:
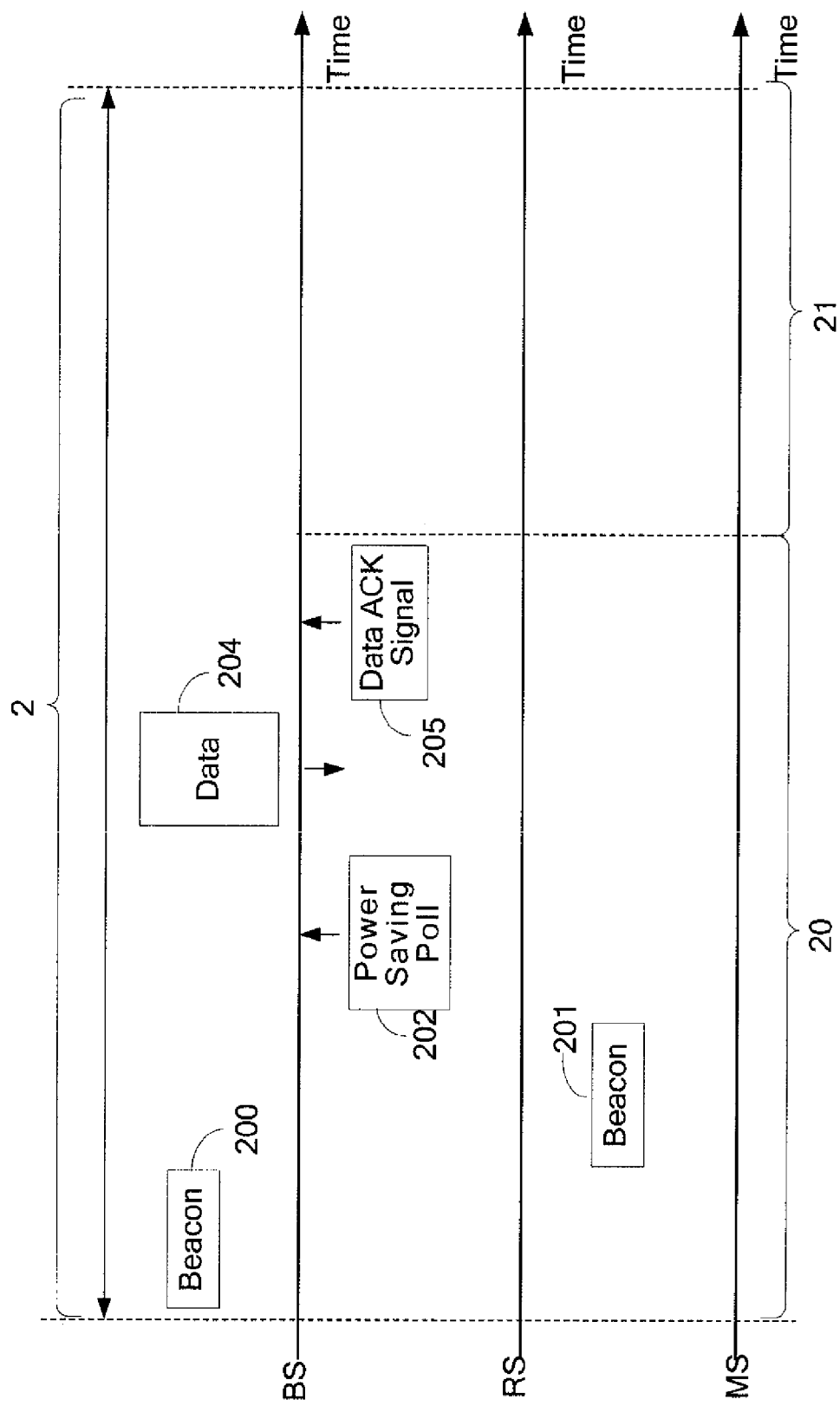
FIG. 2 is a schematic view of a signal transmission in the conventional wireless mesh network.
Figure 3:
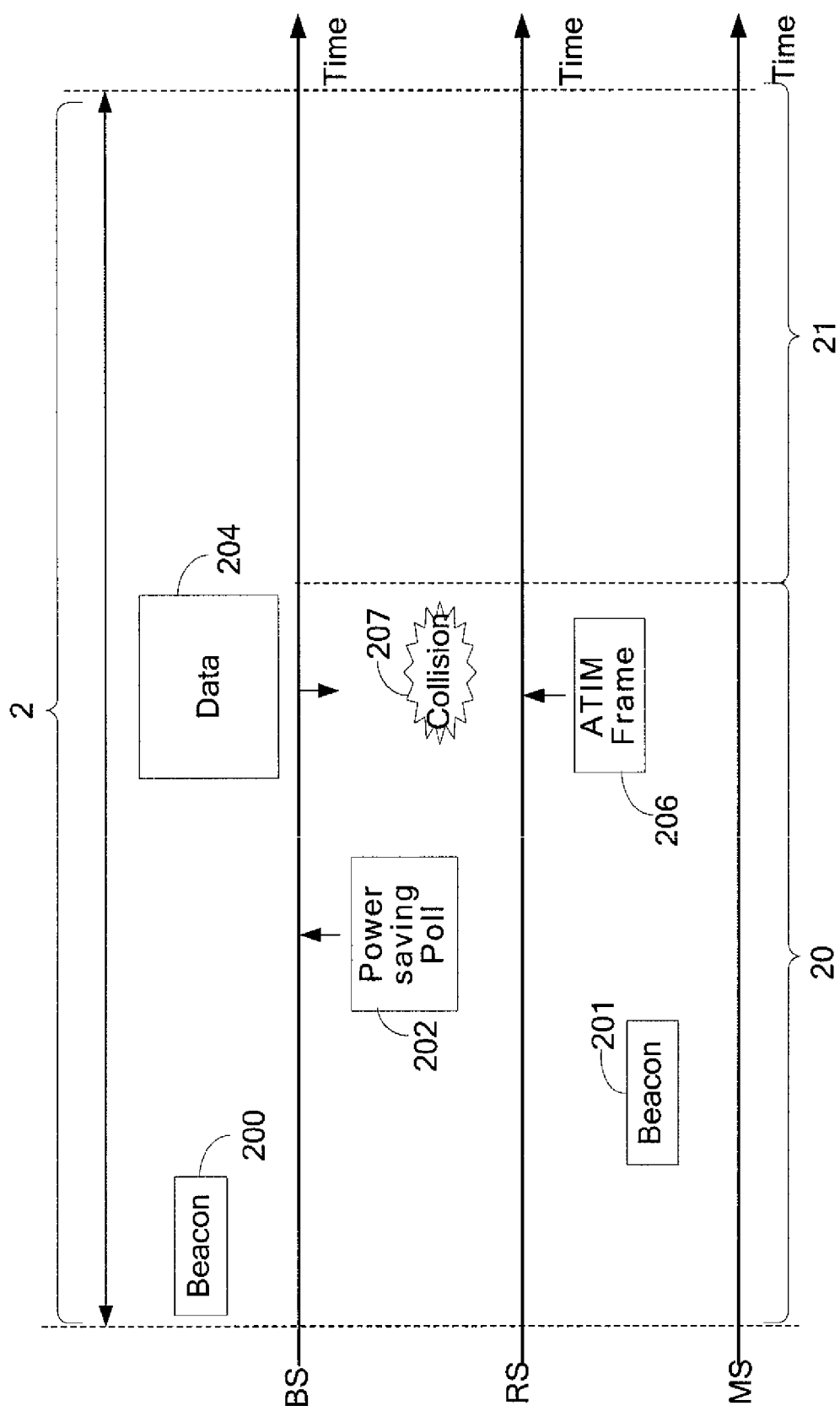
FIG. 3 is another schematic view of a signal transmission in the conventional wireless mesh network.
Figure 4:
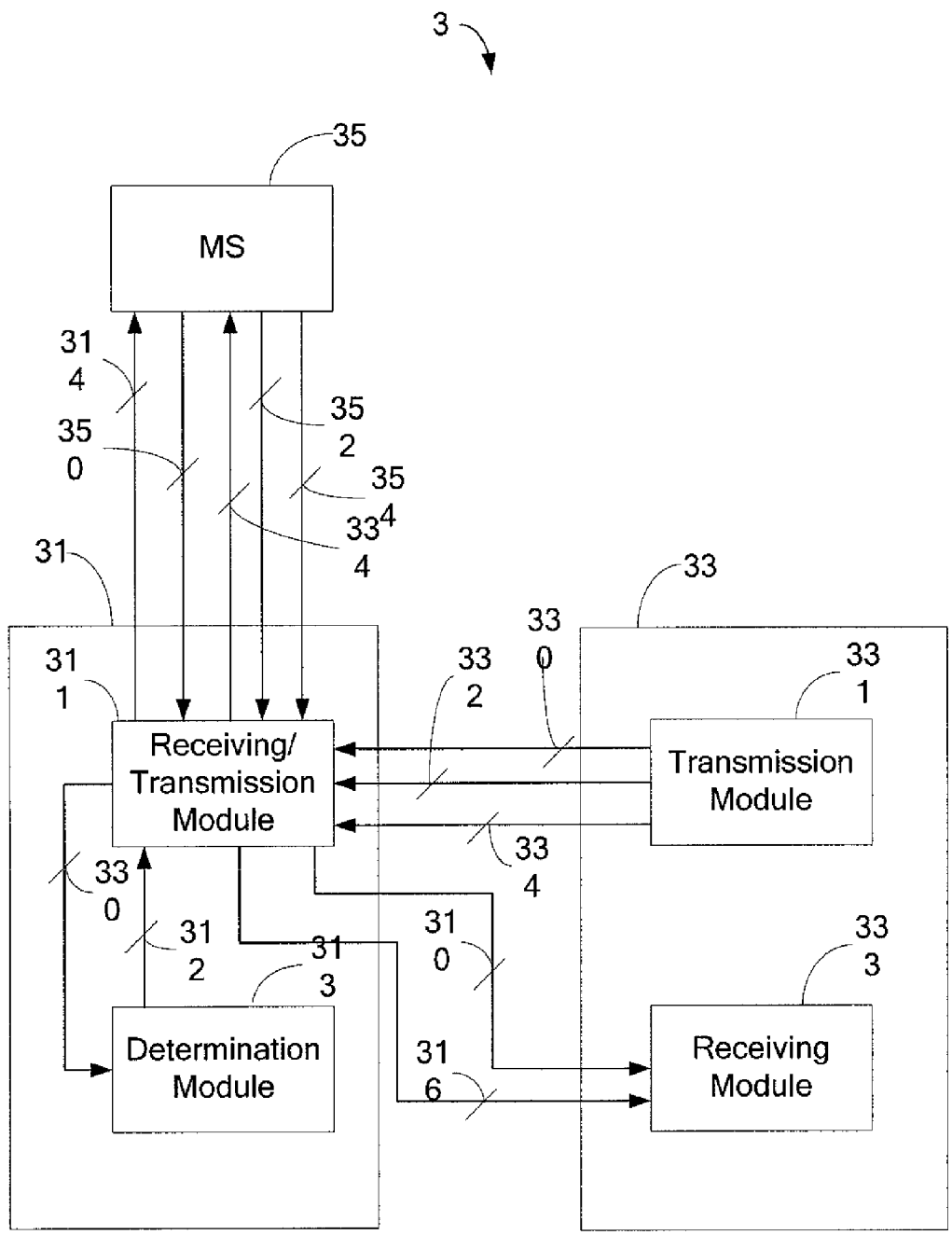
FIG. 4 is a schematic view of a wireless mesh network in accordance with the first example of the first preferred embodiment of the present invention.

A first preferred embodiment of the present invention is illustrated in FIG. 4, which is a schematic view of a wireless mesh network 3 based on the IEEE 802.11 standard. The wireless mesh network 3 comprises an RS 31, a BS 33 and an MS 35. The RS 31 is an MS with a relaying capability. More specifically, the RS 31 is located within a coverage area of the BS 33 and a coverage area of the MS 35, so it is able to receive a BS beacon 330 and an MS signal (data or beacon) 350 from the BS 33 and the MS 35 respectively. In contrast, the MS 35 is located only within a coverage area of the RS 31, so it is only able to receive a signal from or send a signal to the RS 31. In other words, the wireless mesh network 3 of this preferred embodiment is composed of an infrastructure WLAN in combination with an ad-hoc network, wherein the infrastructure WLAN comprises the RS 31 and the BS 33 and the ad-hoc network comprises the RS 31 and the MS 35. This is well-known by those skilled in the art, and thus will not be further described herein.

Figure 5:
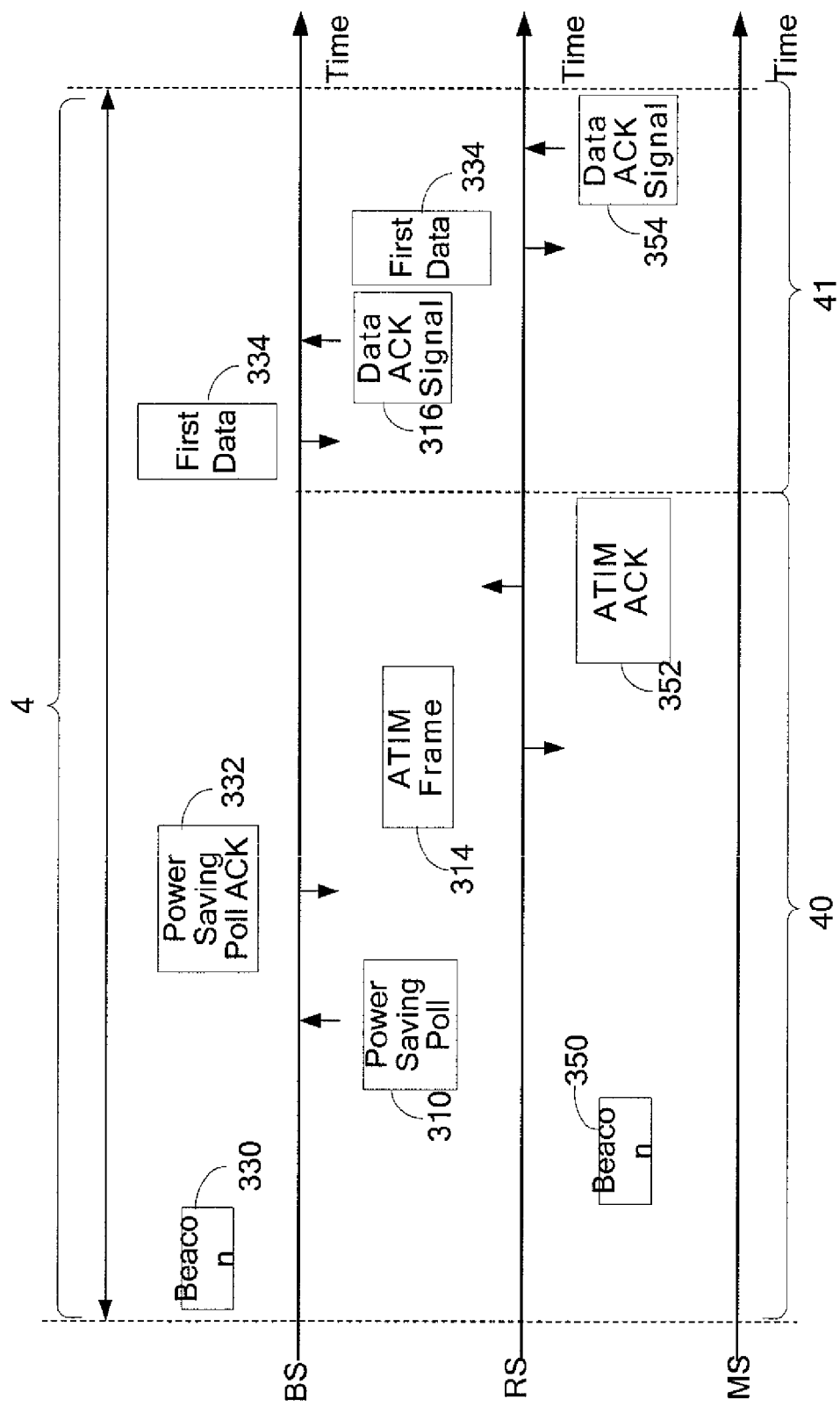
FIG. 5 is a schematic view of a signal transmission in the wireless mesh network in accordance with the first example of the first preferred embodiment.

As a first example of this preferred embodiment, the BS 33 attempts to transmit a first data 334 to the MS 35 via the RS 31. To facilitate the understanding of the first example, FIG. 5 illustrates a schematic view of a signal transmission in the wireless mesh network 3. In FIG. 5, axes corresponding to the BS, while the RS and the MS denote time axes corresponding to the BS 33, the RS 31 and the MS 35 of FIG. 4 respectively.

The RS 31 comprises a receiving/transmission module 311 and a determination module 313. The BS 33 comprises a transmission module 331 and a receiving module 333. At the start of each beacon interval 4, the transmission module 331 of the BS 33 broadcasts a BS beacon 330 to all of the RSs and MSs within a coverage area thereof. In this embodiment, it is the RS 31 that can receive the BS beacon 330. Also, the MS 35 and the RS 31 contend to broadcast an beacon 350 within the ATIM window 40. In this preferred embodiment, the MS 35 win the contention and thus MS beacon 350 to the RS 31. Because the first preferred embodiment conforms to the IEEE 802.11 standard, the ATIM window 40 has an ATIM frame defined under the IEEE 802.11 standard.

First, the method for transmitting the first data 334 from the BS 33 to the RS 31 will be explained. Once the BS beacon 330 is sent by the BS 33, the RS 31 receives the BS beacon 330 via the receiving/transmission module 311 within the ATIM window 40. Likewise, once the MS beacon 350 is sent by the MS 35, the RS 31 receives the MS beacon 350 via the receiving/transmission module 311 within the ATIM window 40.

Next, according to the BS beacon 330, the determination module 313 determines that the BS 33 attempts transmit a first data 334 to the RS 31 and generates a determination result 312. Specifically, according to the IEEE 802.11 standard, the BS beacon 330 incorporates a traffic indication MAP (TIM) which lists, in a tabular form, the MSs that have data buffered in BS thereof.

In response to the determination result 312, the receiving/transmission module 311 sends a power saving poll 310 to the BS 33 after receiving the BS beacon 330. Via the receiving module 333, the BS 33 receives the power saving poll 310 within the first period of time (i.e., the ATIM window 40). Under the IEEE 802.11 standard, the power saving poll 310 is a PS-Poll frame. As the first period of time (i.e., the ATIM window 40) is defined in the standard of the ad-hoc network, the BS 33 is unaware of the existence of ad-hoc network and the time length of the first period of time (i.e., the ATIM window 40). To solve this problem, the power saving poll 310 may contain message indicative of the existence of ad-hoc network and the time length of the first period of time (i.e., the ATIM window 40). This will allow the BS 33 to learn the time length of the first period of time (i.e., the ATIM window 40). Another way to inform the BS 33 of the first period of time (i.e., the ATIM window 40) is to send an association frame (or re-association frame) from the receiving/transmission module 311 of the RS 31 to the BS 33, where the association frame (or re-association frame) contains message on the existence of ad-hoc network and the time length of the first period of time (i.e., the ATIM window 40). The way for determining the time length of the first period of time of the BS 33 (i.e., the ATIM window 40) may be determined by practical conditions, and is not intended to limit the scope of the present invention.

Then, in response to the power saving poll 310, the transmission module 331 of the BS 33 transmits a power saving poll acknowledgement (ACK) 332 to the RS 31. In response to transmission of the power saving poll 310, the receiving/transmission module 311 of the RS 31 receives the power saving poll ACK 332 of the BS 33. Under the IEEE 802.11 standard, power saving poll ACK 332 is a response signal (PS-Poll ACK). Afterwards, the transmission module 331 of the BS 33 transmits the first data 334 to the RS 31 within a second period of time following the first period of time (i.e., the ATIM window 40). Within a second period of time (i.e., a part of the data window 41) following the first period of time (i.e., the ATIM window 40), the RS 31 receives the first data 334 transmitted by the BS 33. After receiving the first data 334, the receiving/transmission module 311 of the RS 31 transmits a data acknowledgement signal 316 to the BS 33 within the second period of time to inform the BS 33 that the first data 334 has been received by the RS 31. After the first data 334 is transmitted and still within the second period of time, the receiving module 333 of the BS 33 receives the data acknowledgement signal 316 to acknowledge that the first data 334 has been received by the RS 31. Under the IEEE 802.11 standard, the data acknowledgement signal 316 is a data response signal (DATA ACK). The sum of the time length of the first period of time (i.e., the ATIM window 40) and that of the second period of time is equal to the time length of the beacon interval 4.

Next, the method for transmitting the first data 334 from the RS 31 to the MS 35 will be explained.

Within the first period of time (i.e., the ATIM window 40), the receiving/transmission module 311 of the RS 31 transmits an ATIM frame 314 to the MS 35 to indicate that it attempts to transmit the first data 334 to the MS 35. Then, in response to transmission of the ATIM frame 314, the receiving/transmission module 311 receives an ATIM ACK 352 from the MS 35 to acknowledge that the MS 35 agrees to receive the first data 334. Afterwards, the receiving/transmission module 311 of the RS 31 transmits the first data 334 to the MS 35 within the second period of time. After receiving the first data 334 within the second period of time, the MS 35 transmits a data acknowledgement signal 354 to the RS 31 to inform that the first data 334 has been received.

Figure 6:
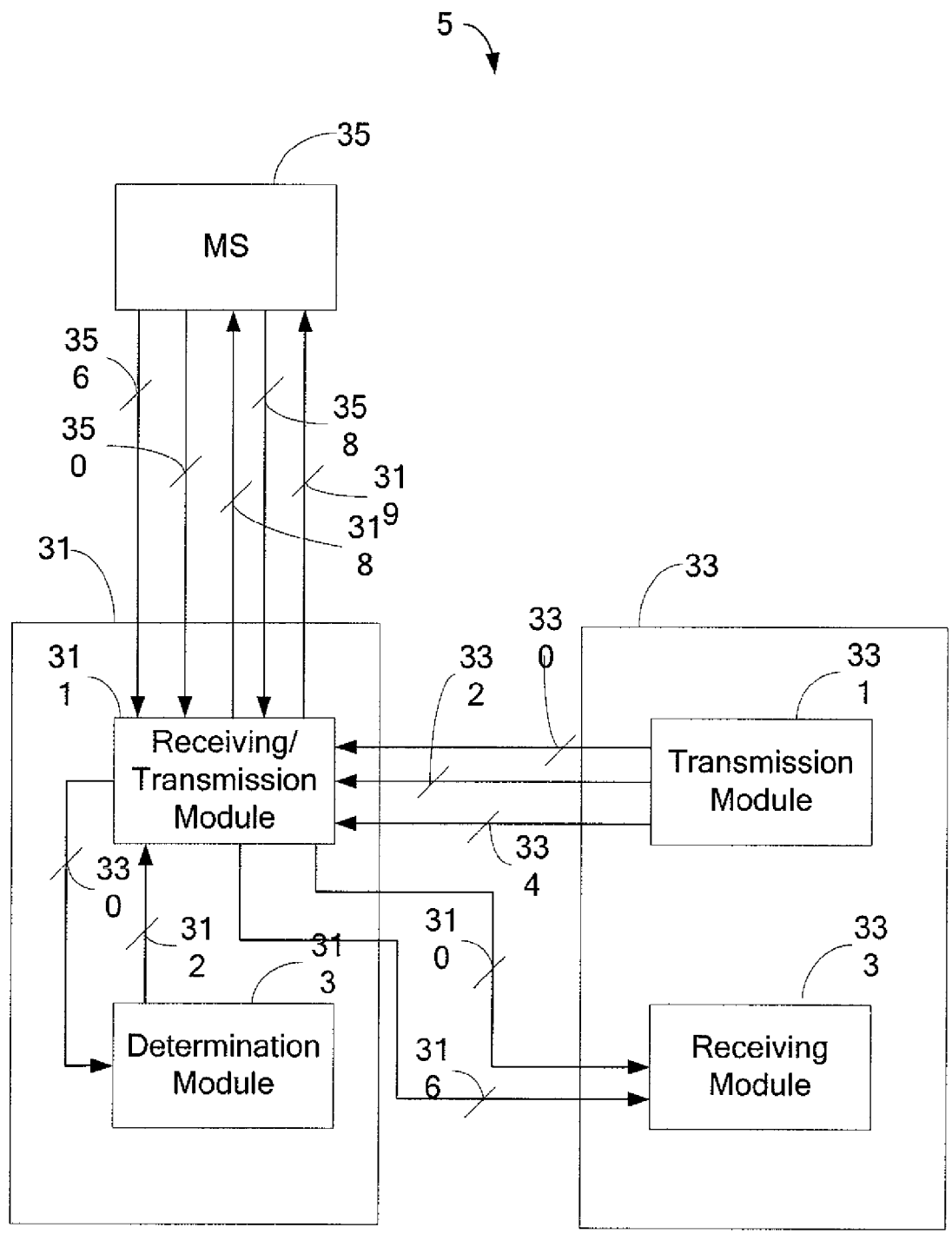
FIG. 6 is a schematic view of a wireless mesh network in accordance with the second example of the first preferred embodiment.

A second example of this preferred embodiment is illustrated in FIG. 6, which is a schematic view of a wireless mesh network 5 based on the IEEE 802.11 standard. In the second example, the BS 33 and the MS 35 attempt to transmit the first data 334 and second data 358 to the RS 31 respectively. The manner in which the BS 33 transmits the first data 334 to the RS 31 is just the same as what is described in the first example, and hence only the transmission of the second data 358 from the MS 35 to the RS 31 will be described herein.

Figure 7:
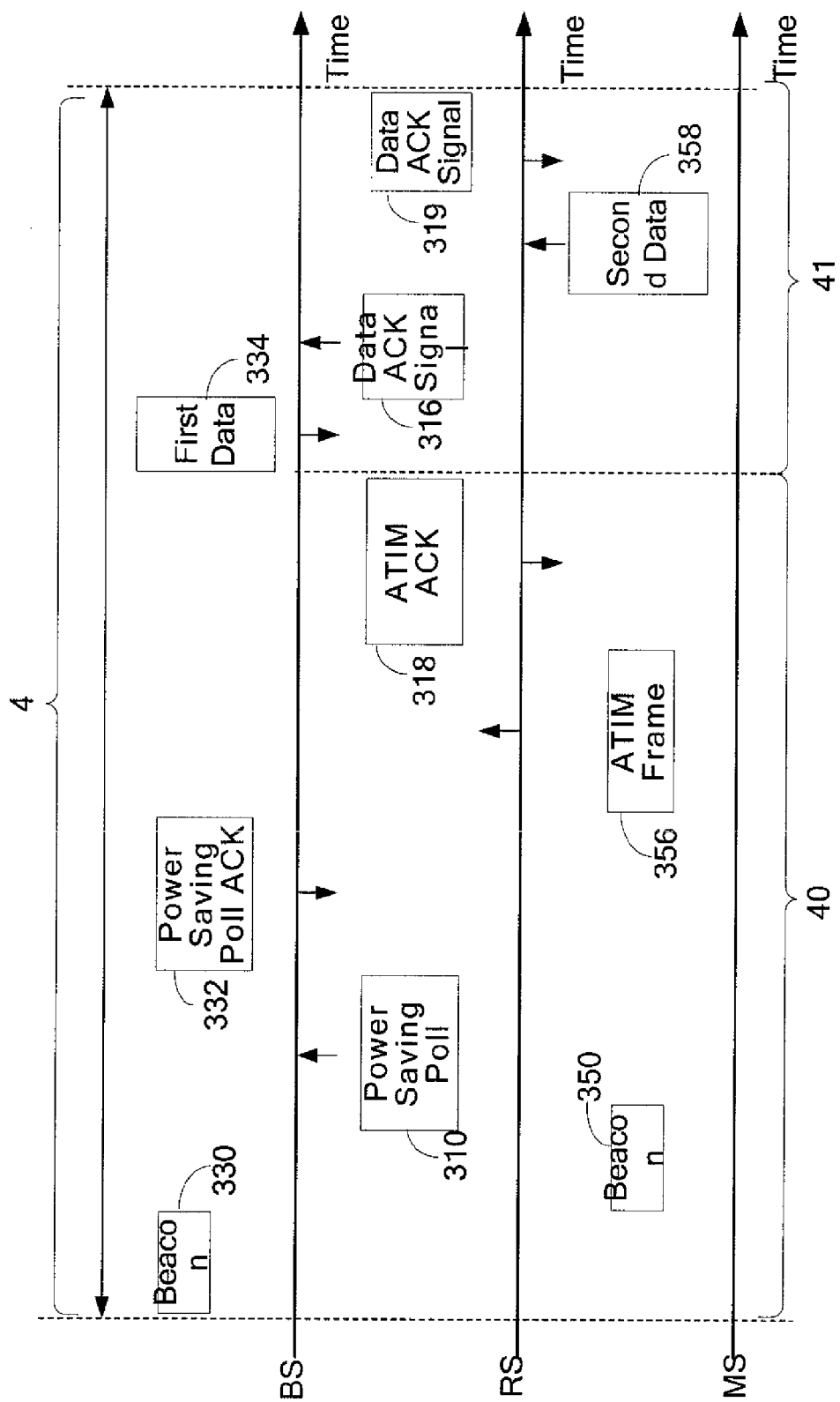
FIG. 7 is a schematic view of a signal transmission in the wireless mesh network in accordance with the second example of the first preferred embodiment.

To facilitate the understanding of the second example, FIG. 7 illustrates a schematic view of a signal transmission in the wireless mesh network 5. In FIG. 7, the axes corresponds to the BS, while the RS and the MS denote time axes corresponding to the BS 33, the RS 31 and the MS 35 of FIG. 6 respectively.

Like the first example that the RS 31 must transmit the ATIM frame 314 to the MS 35 first if it attempts to transmit the first data 334 to the MS 35, the MS 35 of the second example must transmit an ATIM frame 356 to the RS 31 at first as well. Specifically, the receiving/transmission module 311 of the RS 31 receives the ATIM frame 356 from the MS 35 within the first period of time (i.e., the ATIM window 40). In response to the receipt of the ATIM frame 356, the receiving/transmission module 311 of the RS 31 transmits an ATIM ACK 318 to the MS 35 within the first period of time (i.e., the ATIM window 40), and receives the second data 358 of the MS 35 within a second period of time following the first period of time. Likewise, after receiving the second data 358, the RS 31 must also transmit a data acknowledgement signal 319 to the MS 35 via the receiving/transmission module 311 thereofr within the second period of time to inform the MS 35 that the second data 358 has been received successively.

Further, it should be noted that, in some examples, the BS 33 may receive multiple power saving polls. After receiving these power saving polls, the BS 33 has to transmit a power saving poll ACK to each of the MSs or RSs corresponding to these power saving polls. In other words, if the BS 33 receives ten power saving polls from different MSs, it will transmit ten power saving poll ACKs to each of the MSs respectively. Alternatively, another method may be used in the first preferred embodiment to prevent wasted time during the aforementioned first period of time (i.e., the ATIM window). Specifically, the power saving poll ACK transmitted by the transmission module 331 of the BS 10 may contain a bitmap which records message about whether the power saving poll is received by the BS 35. Furthermore, the transmission module 331 of the BS 10 broadcasts the power saving poll ACK to each of the MSs. After receiving the power saving polls of the MSs, the BS 33 can inform the MSs whether the power saving polls have been received by transmitting the power saving poll ACK containing the bitmap only once.

With the above configurations of the present invention, a power saving poll ACK is transmitted to the RS by the BS when the BS receives a power saving poll, so that data transmission from the BS to the RS may be postponed from the first period of time (i.e., the ATIM window) to the second period of time (i.e., a part of the data window). This may effectively postpone data transmission from the first period of time to the second period of time, thus increasing the throughput within a single beacon interval.

Figure 8:
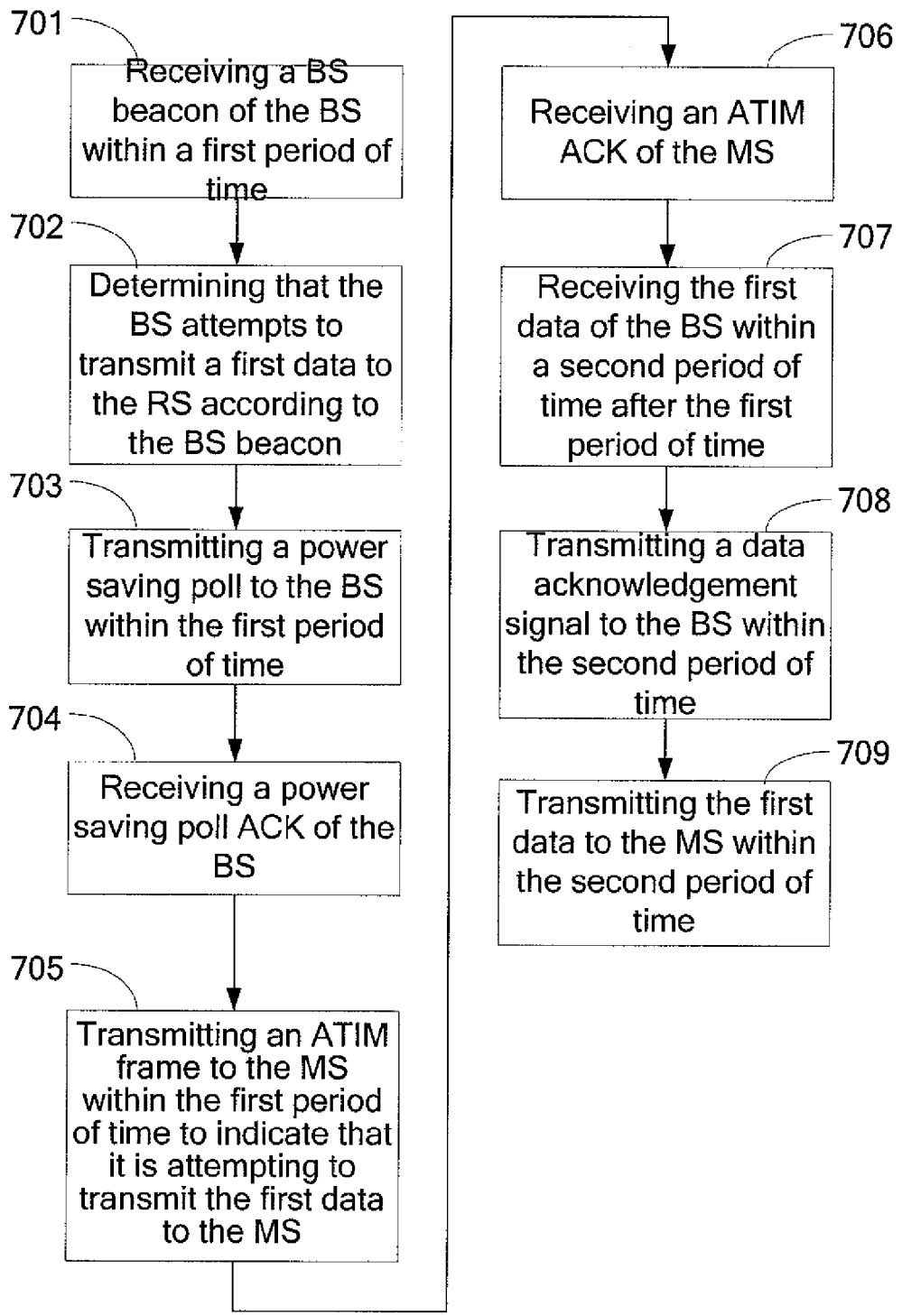
FIG. 8 is a flow chart of a first example of the second preferred embodiment of the present invention.

A second preferred embodiment of the present invention is a power management method for use in an RS of a wireless mesh network based on the IEEE 802.11 standard. It should be noted that the power management method in this embodiment can perform transmission method which is executed by a wireless station (such as a BS, an RS, or an MS) of a wireless network in a power saving mode. The wireless mesh network comprises a BS, and the RS is located within a coverage area of the BS. A first example of this preferred embodiment is illustrated in FIG. 8, which is a flow chart of a power management method for transmitting a first data from a BS to an MS via an RS. Initially in step 701, a BS beacon of the BS is received within a first period of time. Then, in step 702, it is determined that the BS attempts to transmit a first data to the RS according to the BS beacon.

Next, in step 703, a power saving poll is transmitted to the BS within the first period of time in response to the determination step 702. Afterwards, in step 704, a power saving poll ACK of the BS is received in response to the transmission of the power saving poll. Subsequently, this method proceeds to step 705 where an ATIM frame is transmitted to the MS within the first period of time to indicate that it is attempting to transmit the first data to the MS. Then, in step 706, in response to the transmission of the ATIM frame, an indication ATIM ACK of the MS is received to acknowledge that the MS agrees to receive the first data. Next, in step 707, the first data transmitted by the BS is received within a second period of time following the first period of time. In step 708, a data acknowledgement signal is transmitted to the BS within the second period of time. Finally, in step 709, the first data is transmitted to the MS within the second period of time.

Figure 9:
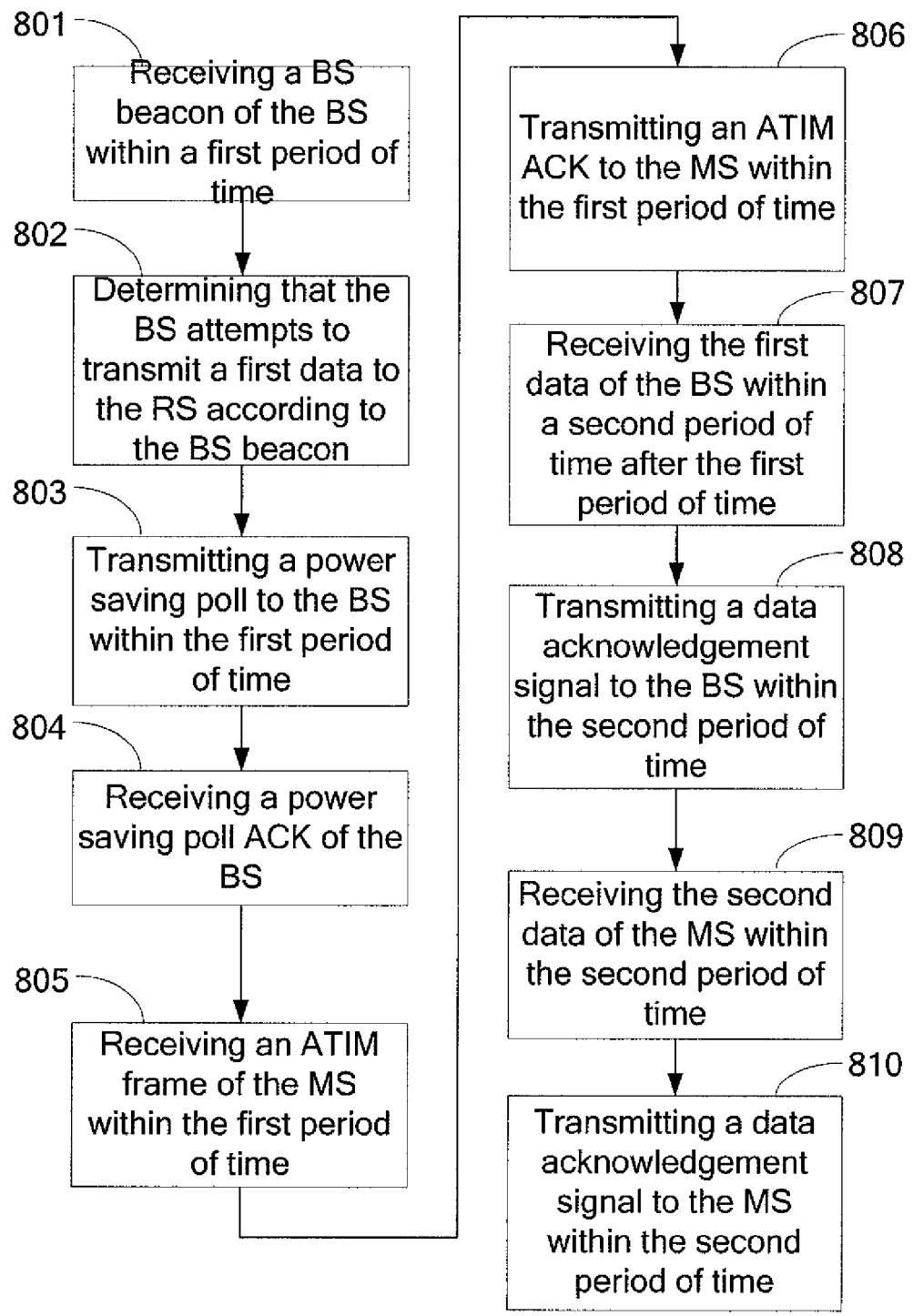
FIG. 9 is a flow chart of a second example of the second preferred embodiment.

The second example of this preferred embodiment is illustrated in FIG. 9, which is a flow chart of a power management method for transmitting a first data and second data respectively from a BS and an MS to an RS. Initially in step 801, a BS beacon of the BS is received within a first period of time in the start of the beacon interval. Then, in step 802, the RS determines that the BS attempts to transmit a first data to it according to the BS beacon.

Next, in step 803, a power saving poll is transmitted to the BS after the BS beacon is received in response to the determination result. Afterwards, in step 804, a power saving poll ACK of the BS is received in response to the transmission of the power saving poll. Then, this method proceeds to step 805 where an ATIM frame of the MS is received within the first period of time. Then, in step 806, in response to the receipt of the ATIM frame, an ATIM ACK is transmitted to the MS within the first period of time. Next, in step 807, the first data transmitted by the BS is received within a second period of time following the first period of time. In step 808, a data acknowledgement signal is transmitted to the BS within the second period of time. Then, in step 809, the second data transmitted by the MS is received within the second period of time. Finally in step 810, a data acknowledgement signal is transmitted to the MS within the second period of time.

Figure 10:
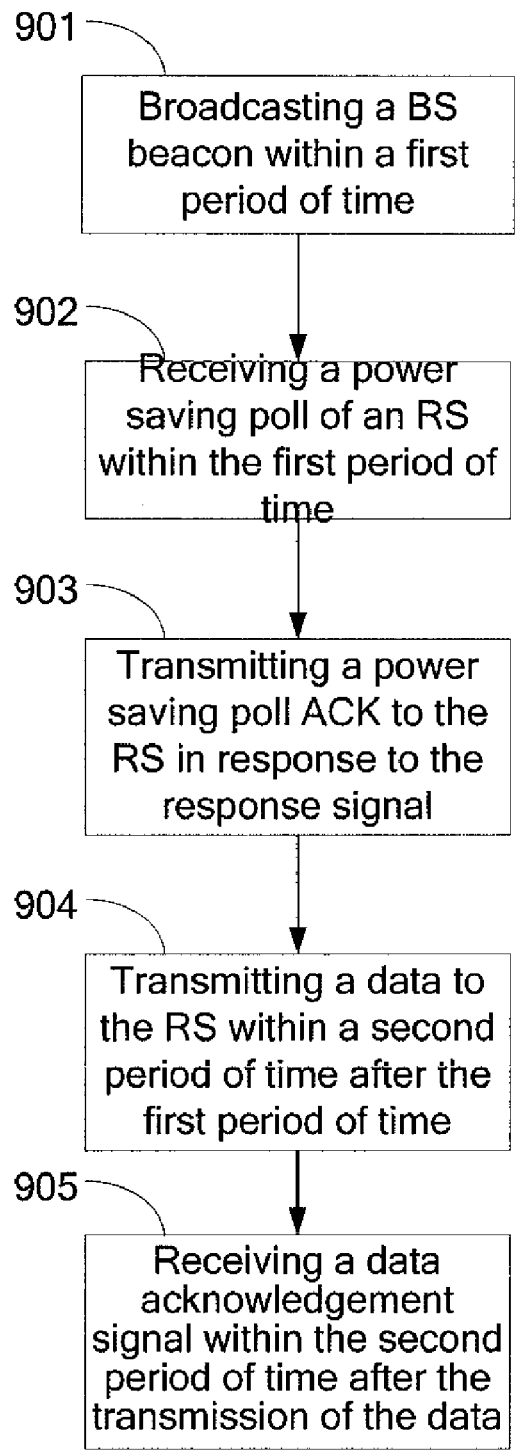
FIG. 10 is a flow chart of a third preferred embodiment of the present invention.

A third preferred embodiment of the present invention is illustrated in FIG. 10, which is a flow chart of a power management method for use in a BS of a wireless mesh network based on the IEEE 802.11 standard. It should be noted that the power management method in this embodiment can perform transmission method which is executed by a wireless station (such as a BS, an RS, or an MS) of a wireless network in a power saving mode. The wireless mesh network comprises an RS located within a coverage area of the BS. Initially in step 901, a BS beacon is broadcasted within a first period of time in the start of beacon interval. Then, in step 902, a power saving poll of an RS is received after the BS beacon. Next, in step 903, a power saving poll ACK is transmitted to the RS in response to the power saving poll, and in step 904, a data is transmitted to the RS within a second period of time following the first period of time. Finally in step 905, a data acknowledgement signal is received within the second period of time after the transmission of the data to acknowledge that the data has been received by the RS.

The aforementioned methods may utilize a computer readable medium, which stores the aforementioned computer program to execute the steps of the aforementioned methods. The computer readable medium may be a floppy disk, a hard disk, a compact disk, a mobile disk, a magnetic tape, a database accessible to networks, or any other storage media with the same function and well-known by those skilled in the art.

In summary, by transmitting a power saving poll ACK from a BS to an RS when the BS receives a power saving poll, data transmission from the BS to the RS may be postponed from a first period of time (i.e., ATIM window) to a second period of time (i.e., a part of the data window). In this way, data transmission can be effectively postponed until the second period of time to increase the throughput within a single beacon period.

The above disclosure is related to the detailed technical contents and inventive features thereof. People skilled in this field may proceed with a variety of modifications and replacements based on the disclosures and suggestions of the inven-

What is claimed is:

1. A relay station (RS) for use in a wireless mesh network, the wireless mesh network comprising a base station (BS), the RS being located within a coverage area of the BS, the RS comprising:
   a receiving/transmission module, being configured to receive a BS beacon of the BS in a first period of time; and
   a determination module, being configured to determine that the BS attempts to transmit a first data to the RS as a determination result according to the BS beacon;
   wherein the receiving/transmission module is further configured to transmit a power saving poll to the BS in the first period of time in response to the determination result, receive a power saving poll acknowledgement (ACK) of the BS in response to the transmission of the power saving poll, and receive the first data of the BS in a second period of time after the first period of time, wherein a sum of the first period of time and the second period of time in time length is equal to a beacon interval in time length.

2. The RS as claimed in claim 1, wherein the wireless mesh network further comprises a mobile station (MS) located within a coverage area of the RS, the receiving/transmission module is further configured to transmit an ATIM frame to the MS in the first period of time, so as to indicate that the RS attempts to transmit the first data to the MS, the receiving/transmission module is further configured to receive an ATIM ACK of the MS in response to the transmission of the ATIM frame to confirm that the MS agrees to receive the first data, and the receiving/transmission module is further configured to transmit the first data to the MS in the second period of time.

3. The RS as claimed in claim 1, wherein the wireless mesh network further comprises an MS located within a coverage area of the RS, the receiving/transmission module is further configured to receive an ATIM frame of the MS in the first period of time, transmit an ATIM ACK to the MS in the first period of time in response to the receiving of the ATIM frame, and receive a second data of the MS in the second period of time.

4. The RS as claimed in claim 1, wherein the power saving poll comprises a message indicating a time length of the first period of time.

5. The RS as claimed in claim 1, wherein the receiving/transmission module is further configured to transmit an RS beacon to the BS, and the RS beacon comprising a message indicating a time length of the first period of time.

6. The RS as claimed in claim 1, wherein the receiving/transmission module is further configured to transmit a data acknowledgement signal to the BS in the second period of time after receiving the first data, so as to inform the BS that the first data has been received.

7. The RS as claimed in claim 1, wherein the receiving/transmission module is further configured to transmit an association/re-association frame to the BS, and the association/re-association frame comprising a message indicating a time length of the first period of time.

8. A BS adapted to work with the RS of claim 1, the RS being located within a coverage area of the BS, the BS comprising:
   a transmission module, being configured to broadcast a BS beacon in a first period of time; and
   a receiving module, being configured to receive a power saving poll of the RS in the first period of time;
   wherein the transmission module is further configured to transmit a power saving poll ACK to the RS in response to the power saving poll, and transmit a data to the RS in a second period of time after the first period of time, wherein a sum of the first period of time and the second period of time in time length is equal to a beacon interval in time length.

9. The BS as claimed in claim 8, wherein the power saving poll ACK comprises a bitmap recording that the power saving poll has been received by the BS.

10. The BS as claimed in claim 8, wherein the receiving module is further configured to receive a data acknowledgement signal to confirm that the data has been received by the RS in the second period of time after the transmission of the data.

11. A power management method for use in an RS of a wireless mesh network, the wireless mesh network comprising a BS, the RS being located within a coverage area of the BS, the power management method comprising the following steps of:
   receiving a BS beacon of the BS in a first period of time;
   determining that the BS attempts to transmit a first data to the RS as a determination result according the BS beacon;
   transmitting a power saving poll to the BS in the first period of time in response to the determination result;
   receiving a power saving poll ACK of the BS in response to the transmission of the power saving poll; and
   receiving the first data of the BS in a second period of time after the first period of time,
   wherein a sum of the first period of time and the second period of time in time length is equal to a beacon interval in time length.

12. The power management method as claimed in claim 11, wherein the wireless mesh network further comprises an MS located within a coverage area of the RS, and the power management method further comprises the following steps of:
   transmitting an ATIM frame to the MS in the first period of time, so as to indicate that the RS attempts to transmit the first data to the MS;
   receiving an ATIM ACK of the MS in response to the transmission of the ATIM frame to confirm that the MS agrees to receive the first data; and
   transmitting the first data to the MS in second period of time.

13. The power management method as claimed in claim 11, wherein the wireless mesh network further comprises an MS located within a coverage area of the RS, and the power management method further comprises the following steps of:
   receiving an ATIM frame of the MS in the first period of time;
   transmitting an ATIM ACK in the first period of time in response to the receiving of the ATIM frame; and
   receiving a second data of the MS in the second period of time.

14. The power management method as claimed in claim 11, wherein the power saving poll comprises a message indicating a time length of the first period of time.

15. The power management method as claimed in claim 11, further comprising a step of transmitting an RS beacon to the BS, and the RS beacon comprising a message for indicating a time length of the first period of time.

16. The power management method as claimed in claim 11, further comprising a step of transmitting a data acknowledgement signal to the BS in the second period of time after receiving the first data, so as to inform the BS that the first data has been received.

17. The power management method as claimed in claim 11, further comprising a step of transmitting an association/re-association frame to the BS, and the association/re-association frame comprising a message indicating a time length of the first period of time.

18. A power management method for use in a BS, the power management method being adapted to working with the power management method of claim 11 and comprising the following steps of:
broadcasting a BS beacon in a first period of time;
receiving a power saving poll of an RS located within a coverage area of the BS in the first period of time;
transmitting a power saving poll ACK to the RS in response to the power saving poll; and
transmitting a data to the RS in a second period of time after the first period of time,
wherein a sum of the first period of time and the second period of time in time length is equal to a beacon interval in time length.

19. The power management method as claimed in claim 18, wherein the power saving poll ACK comprises a bitmap recording that the power saving poll has been received by the BS.

20. The power management method as claimed in claim 18, further comprising a step of receiving a data acknowledgement signal in the second period of time after the transmission of the data to confirm that the data has been received by the RS.

21. A non-transitory computer readable medium containing instructions for enabling an RS of a wireless mesh network to perform transmission, the wireless mesh network comprising a BS, the RS being located within a coverage area of the BS, the instructions comprising:
code that enables the RS to receive a BS beacon of the BS in a first period of time;
code that enables the RS to determine that the BS attempts to transmit a first data to the RS as a determination result according the BS beacon;
code that enables the RS to transmit a power saving poll to the BS in the first period of time in response to the determination result;
code that enables the RS to receive a power saving poll ACK of the BS in response to the transmission of the power saving poll; and
code that enables the RS to receive the first data of the BS in a second period of time after the first period of time,
wherein a sum of the first period of time and the second period of time in time length is equal to a beacon interval in time length.

22. The non-transitory computer readable medium as claimed in claim 21, wherein the wireless mesh network further comprises an MS located within a coverage area of the RS, and the instructions further comprises:
code that enables the RS to transmit an ATIM frame to the MS in the first period of time, so as to indicate the MS that the RS attempts to transmit the first data to the MS;
code that enables the RS to receive an ATIM ACK of the MS in response to the transmission of the ATIM frame to confirm that the MS agrees to receive the first data; and
code that enables the RS to transmit the first data to the MS in second period of time.

23. The non-transitory computer readable medium as claimed in claim 21, wherein the wireless mesh network further comprises an MS located within a coverage area of the RS, and the instructions further comprises:
code that enables the RS to receive an ATIM frame of the MS in the first period of time;
code that enables the RS to transmit an ATIM ACK in the first period of time in response to the receiving of the ATIM frame; and
code that enables the RS to receive a second data of the MS in the second period of time.

24. The non-transitory computer readable medium as claimed in claim 21, wherein the power saving poll comprises a message indicating a time length of the first period of time.

25. The non-transitory computer readable medium as claimed in claim 21, wherein the instructions further comprises code that enables the RS to transmit an RS beacon to the BS, and the RS beacon comprises a message for indicating a time length of the first period of time.

26. The non-transitory computer readable medium as claimed in claim 21, wherein the instructions further comprises code that enables the RS to transmit a data acknowledgement signal to the BS in the second period of time after receiving the first data, so as to inform the BS that the first data has been received.

27. The non-transitory computer readable medium as claimed in claim 21, wherein the instructions further comprises code that enables the RS to transmit an association/re-association frame to the BS, and the association/re-association frame comprises a message indicating a time length of the first period of time.

28. A non-transitory computer readable medium containing instructions for enabling a BS to perform transmission, the instructions being adapted to work with the instructions of claim 21 and comprising:
code that enables the BS to broadcast a BS beacon in a first period of time;
code that enables the BS to receive a power saving poll of an RS located within a coverage area of the BS in the first period of time;
code that enables the BS to transmit a power saving poll ACK to the RS in response to the power saving poll; and
code that enables the BS to transmit a data to the RS in a second period of time after the first period of time,
wherein a sum of the first period of time and the second period of time in time length is equal to a beacon interval in time length.

29. The non-transitory computer readable medium as claimed in claim 28, wherein the power saving poll ACK comprises a bitmap recording that the power saving poll has been received by the BS.

30. The non-transitory computer readable medium as claimed in claim 28, wherein the instructions further comprises code that enables the BS to receive a data acknowledgement signal in the second period of time after the transmission of the data to confirm that the data has been received by the RS.

* * * * *